3,171,671
STEP FOR VEHICLE
Clinton W. Cornett, 724 Valley Way, Santa Clara, Calif.
Filed July 18, 1963, Ser. No. 295,987
5 Claims. (Cl. 280—163)

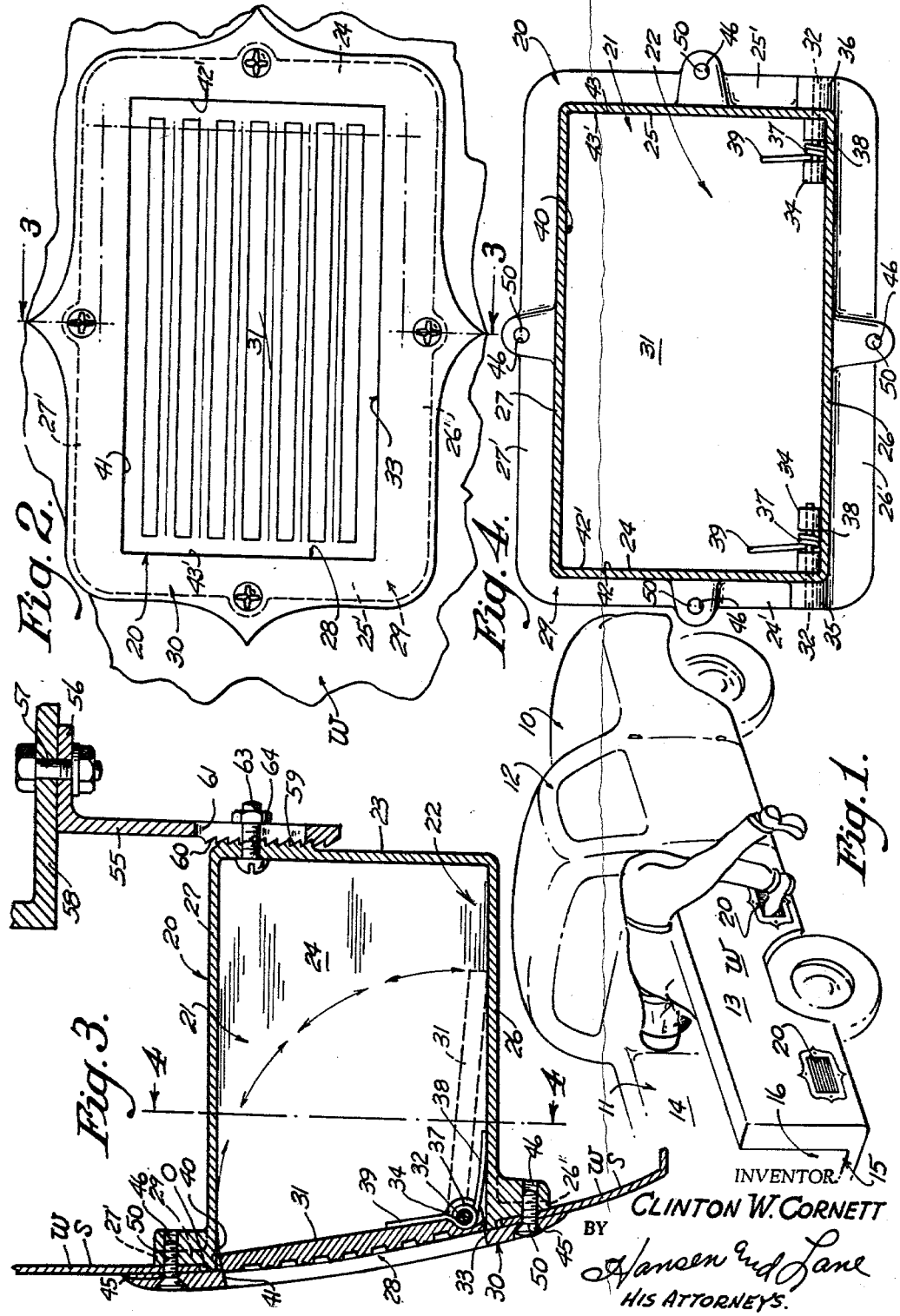

This invention relates to a step for vehicles and more particularly to a self concealed step for the side wall of a truck body.

It is an object of the present invention to provide a step adapted to be secured to a vertical wall of a truck body for swinging movement inward therefrom to provide a toe hole and means for maintaining such step aligned with the vertical wall of the vehicle to conceal the toe hole.

Another object is to provide a step adapted to be confined within and supported on a fender, side wall or other vertical exterior body panel of a vehicle. In this connection it is a still further object to provide a spring loaded tread plate providing a door for concealing the step.

These and other objects and advantages of the present invention will become apparent from a reading of the following description in the light of the drawing in which:

FIG. 1 is a perspective view of a truck as seen from a rear side angle and showing the steps embodying the present invention installed thereon.

FIG. 2 is a front elevation of one of the step units of FIG. 1.

FIG. 3 is a vertical section through FIG. 2 taken along line 3—3 thereof.

FIG. 4 is a rear elevational view of the step unit of FIG. 2 as seen from line 4—4 in FIG. 3.

Referring to the drawing FIG. 1 shows a truck 10 having an open body 11 behind its cab 12 from which side walls 13 and 14 of the body extend rearwardly to a tail gate opening at the after end 15 of the bed 16 of the truck body. While the present disclosure illustrates side walls 13 and 14 molded into a fender structure it will be appreciated that the present invention is contemplated for use as an accessory adapted for installation on any vertical wall W which may be that of a fender or part of the side wall of the body proper of a vehicle.

As previously stated it is an object of the present invention to provide for installation in a vertical panel or wall W of a truck a step 20 by which a person can obtain a toe hold for stepping up to a level from which it is easier to reach into the bed area 16 of the truck body 11 without actually climbing into the same.

The step 20 of the present invention includes a box-like body 21 providing a stirrup like foot hold or toe receiving socket 22. This box-like body 21 has a back 23, sides 24–25, bottom 26 and a top 27 forming a complete closure for the socket 22. The front of the box-like body 21 provides an opening 28 which is bordered by outwardly extending flanges 24', 25', 26' and 27' which project at right angles from the respective sides 24–25, bottom 26 and top 27 of the body 21.

The outwardly extending flanges 24', 25', 26' and 27' form a frame 29 around the opening 28 and serve as mounting flanges for mounting the box-like body upon the vertical wall W in which the step is installed.

The side wall W upon which the step is to be installed is cut out to provide an opening "O" corresponding in width and height to the sides and top and bottom of the box-like body 21. The box-like body 21 is mounted on the back side of vertical wall W with the opening 28 of the body 21 in register with the opening O in the vertical wall W. The flanged frame 29 bears flush against the inside surface S of the wall W. It should here be understood that the wall W is a skirting spaced outwardly from the inner surface of the side wall 13 and/or 14 of the truck body 11 so that no part of the box-like structure 21 extends beyond the same or into the load carrying bed area 16 of the truck body. Moreover, since the vertical wall W is somewhat like the outer skirting of a fender it will be appreciated that the interior of the box-like body is closed against entry of mud, water or other debris, by which it may become clogged up or loaded.

The step further includes an escutcheon frame 30 for covering the rough opening "O" and matching the flanged frame 29 for providing a mounting for step unit 20.

A tread plate 31 is secured to the box-like body 21 by means of hinge pins 32 along the lower edge of the tread plate 31 and adjacent the upper edge of the bottom flange 26' and the sill portion 33 of the escutcheon frame 30. The lower edge of the tread plate 31 is round shaped to provide a hinge barrel 34 having axial bores at its ends to receive the hinge pins 32 which are driven through bosses 35 and 36 at the respective corners of the side flanges 24' and 25' where they merge with the bottom flange 26'.

The hinge 32 has spring 37 coiled about the hinge pin 32 and one end 38 of this coil spring bears against the bottom portion 26 and its other end 39 bears against the back or inner face of the tread plate 31 to normally force the latter toward parallel relation with the escutcheon frame 30.

A suitable stop is provided to limit the movement of the tread plate 31 beyond parallel relation with the escutcheon frame 30. In the present disclosure I prefer to show the tread plate 31 as having a beveled edge 40 which bears against a counter beveled edge 40' on the head stile 41 of the escutcheon frame 30. If desired both side edges 42 and 43 of the tread plate can also be beveled as shown in FIG. 4 to meet and abut counter beveled edges 42' and 43', respectively, formed on the inner edges of the side stiles of the escutcheon frame 30.

With the foregoing arrangement with the tread plate 31 aligned (coplanar) with the escutcheon frame 30 the two present a complete escutcheon for covering the box-like body 21 and its flange frame 29.

The escutcheon frame fits over the flange frame 29 and both have aligned bores 45 and 46 drilled therethrough at the side, top and bottom stiles. Suitable drive screws 50 inserted into these aligned bores 45–46 are driven through them and the vertical wall W to secure the escutcheon frame 30 and box-like body 21 to the wall W.

The tread plate 31 is disposed to swing into the box-like body 21 whenever pressed in that direction. With the entire step thus secured to the wall W a person can press against the tread plate with his toe while inserting his foot into the box-like body. The tread plate 31 thus actually rests upon the bottom 26 of the box-like body 21 under the weight of the person standing on the tread. However, when the person steps down and removes his foot from the box-like body 26, the tread plate 31 automatically swings back up into vertical (closed) position by action of the springs 37.

The box-like body 21 is adapted to be supported by an inner structural member of the vehicle. As illustrated in FIG. 3 this is best accomplished by means of a bracket 55 having one end 56 secured by a bolt 57 to the vehicle chassis 58 and its opposite end secured to one of the walls preferably the back wall 23 of the box-like body 21. In this manner the step 20 is firmly secured betwene the exterior wall W and an internal structural member to assure against any undue strain and to afford maximum safety to any one using the step 20.

The bracket 55 is suited for installation in various ways to compensate for any differences in spacing between the wall W and the chassis 58 as well as any differences in horizontal disposition of the step 20 relative to the chassis. As illustrated the back wall 23 is provided with a saw toothed surface 59 as is one face 60 of the bracket 55. The bracket 55 has a bolt receiving slot 61 formed therein to receive a bolt 62 extending through the wall 23 and having a nut 63 on the bolt for pressing the saw toothed surfaces together in non-slip fashion.

By the foregoing arrangement it will be appreciated that the step 20 is firmly mounted between the outer skirting wall W and the vehicle chassis. The box-like body 21 is neatly concealed behind the wall W and tread plate 31 and at all times the socket 22 is ready to receive a person's foot by pressure against the spring loaded tread plate 31.

While I have described my new concealed toe hole and step for vehicles in specific detail it will be appreciated that the same may be susceptible to variations, alterations and/or modifications without departing from the spirit of my invention therein. I therefore desire to avail myself of all variations, alterations and/or modifications as fairly come within the purview of the appended claims.

What I claim as new and desire to protect by Letters Patent is:

1. A step mounted between the exterior side wall of a vehicle and the chassis thereof comprising a toe hole formed in said exterior wall, a toe receiving box-like body having an open front bordered by an outwardly extending flange frame for bearing against the back surface of said vehicle side wall in register with the toe hole formed therein, an escutcheon frame on the outer side of said exterior wall matching said flange frame, means for securing that portion of said exterior side wall between said escutcheon and flange frame, and means for securing to the inner end of said box-like body connected to the chassis of said vehicle for supporting said box-like body between said exterior side wall and said chassis.

2. A step mounted between the exterior side wall of a vehicle and the chassis thereof comprising a toe hole formed in said exterior wall, a toe receiving box-like body having an open front bordered by an outwardly extending flange frame for bearing against the back surface of said vehicle side wall in register with the toe hole formed therein, an escutcheon frame on the outer side of said exterior wall matching said flange frame, means for securing that portion of said exterior side wall between said escutcheon and flange frame, means secured to the inner end of said box-like body connected to the chassis of said vehicle for supporting said box-like body between said exterior side wall and said chassis and a spring loaded tread plate having its lower edge hingedly connected to said bottom of said box-like body adjacent the flange frame thereof providing a closure for the open front of said box-like body co-planar of the exterior wall of vehicle.

3. A step mounted between the exterior side wall of a vehicle and the chassis thereof comprising a toe hole formed in said exterior wall, a toe receiving box-like body having an open front bordered by an outwardly extending flange frame for bearing against the back surface of said vehicle side wall in register with the toe hole formed therein, an escutcheon frame on the outer side of said exterior wall matching said flange frame, means for securing that portion of said exterior side wall between said escutcheon and flange frame, means secured to the inner end of said box-like body connected to the chassis of said vehicle for supporting said box-like body between said exterior side wall and said chassis, a tread plate having its lower end hingedly connected to said flange frame adjacent, and spring means between said tread plate and said box-like body for normally closing the open front thereof.

4. A step adapted to be mounted between the chassis and the exterior side wall of a vehicle which has been cut to provide a toe receiving opening therethrough, a toe receiving box-like body having back, sides, top and bottom walls and an open front corresponding to the opening in the exterior side wall of said vehicle, a flange frame formed around the open front of said box-like body for bearing against the back face of the side wall of said vehicle, a tread plate having its lower end pivotally mounted in said box-like body adjacent the open front thereof, spring means between said box-like body and said tread plate for normally urging the latter into alignment with said flange frame for closing the open front of said box-like body, an escutcheon frame forming an opening with bearing edges engageable by said tread plate for limiting movement thereof by said spring means, and means for securing the side wall of said vehicle between said escutcheon frame and said flange frame.

5. A step adapted to be mounted between the chassis and the exterior side wall of a vehicle which has been cut to provide a toe receiving opening therethrough, a toe receiving box-like body having back, sides, top and bottom walls and an open front corresponding to the opening in the exterior side wall of said vehicle, a flange frame formed around the open front of said box-like body for bearing against the back face of the side wall of said vehicle, a tread plate having its lower end pivotally mounted in said box-like body adjacent the open front thereof, spring means between said box-like body and said tread plate for normally urging the latter into alignment with said flange frame for closing the open front of said box-like body, an escutcheon frame forming an opening with bearing edges engageable by said tread plate for limiting movement thereof by said spring means, means for securing the side wall of said vehicle between said escutcheon frame and said flange frame, and means for securing the box-like body to the chassis of said vehicle.

References Cited by the Examiner

UNITED STATES PATENTS

| | | | |
|---|---|---|---|
| 282,413 | 7/83 | Thompson | 182—90 |
| 1,378,713 | 5/21 | Nami | 182—90 X |
| 1,415,699 | 5/22 | Porter | 280—163 X |
| 1,953,298 | 4/34 | Goodwin | 182—91 |
| 2,130,837 | 9/38 | Brenner | 105—447 X |
| 2,407,774 | 9/46 | Fowler. | |
| 2,417,987 | 3/47 | McFarland | 244—129 |

A. HARRY LEVY, *Primary Examiner.*